United States Patent

[11] 3,592,284

| | | |
|---|---|---|
| [72] | Inventor | Bernard Rene Mennesson<br>Neuilly-Sur-Seine, France |
| [21] | Appl. No. | 854,445 |
| [22] | Filed | Sept. 2, 1969 |
| [45] | Patented | July 13, 1971 |
| [73] | Assignee | Societe D'Appareils De Controle Et<br>D'Equipment Des Moteurs S. A. C. E. M.<br>Neuilly-Sur-Seine, France |
| [32] | Priority | Sept. 30, 1968 |
| [33] | | France |
| [31] | | 168,136 |

[54] MOTORBICYCLE
9 Claims, 4 Drawing Figs.

[52] U.S. Cl. ........................................ 180/33, 64/14
[51] Int. Cl. ........................................ B62k 11/00
[50] Field of Search ........................................ 180/32, 33, 33 B, 64; 64/14

[56] References Cited
UNITED STATES PATENTS

| 1,167,625 | 1/1916 | Chapin | 180/32 |
| 1,306,995 | 6/1919 | Bradshaw | 180/32 |
| 2,574,602 | 11/1951 | Thomas | 180/33 |

FOREIGN PATENTS

| 713,533 | 8/1954 | Great Britain | 180/32 |

Primary Examiner—Kenneth H. Betts
Attorney—Fleit, Gipple and Jacobson

ABSTRACT: The rear-driving wheel of the motorbicycle is connected to the engine by a substantially horizontal transmission shaft. The engine is mounted in the frame by two transverse half-pivots whose axis passes substantially through the engine center of gravity. The engine is prevented from rotating around the half-pivots only by means of the transmission shaft. This transmission shaft extends freely between the engine output shaft and an input shaft providing a connection to the rear wheel, and is held in alignment with the engine output shaft and with the input shaft.

PATENTED JUL 13 1971

INVENTOR
BERNARD RENÉ MENNESSON
BY
Fleit, Gipple & Jacobson
ATTORNEYS

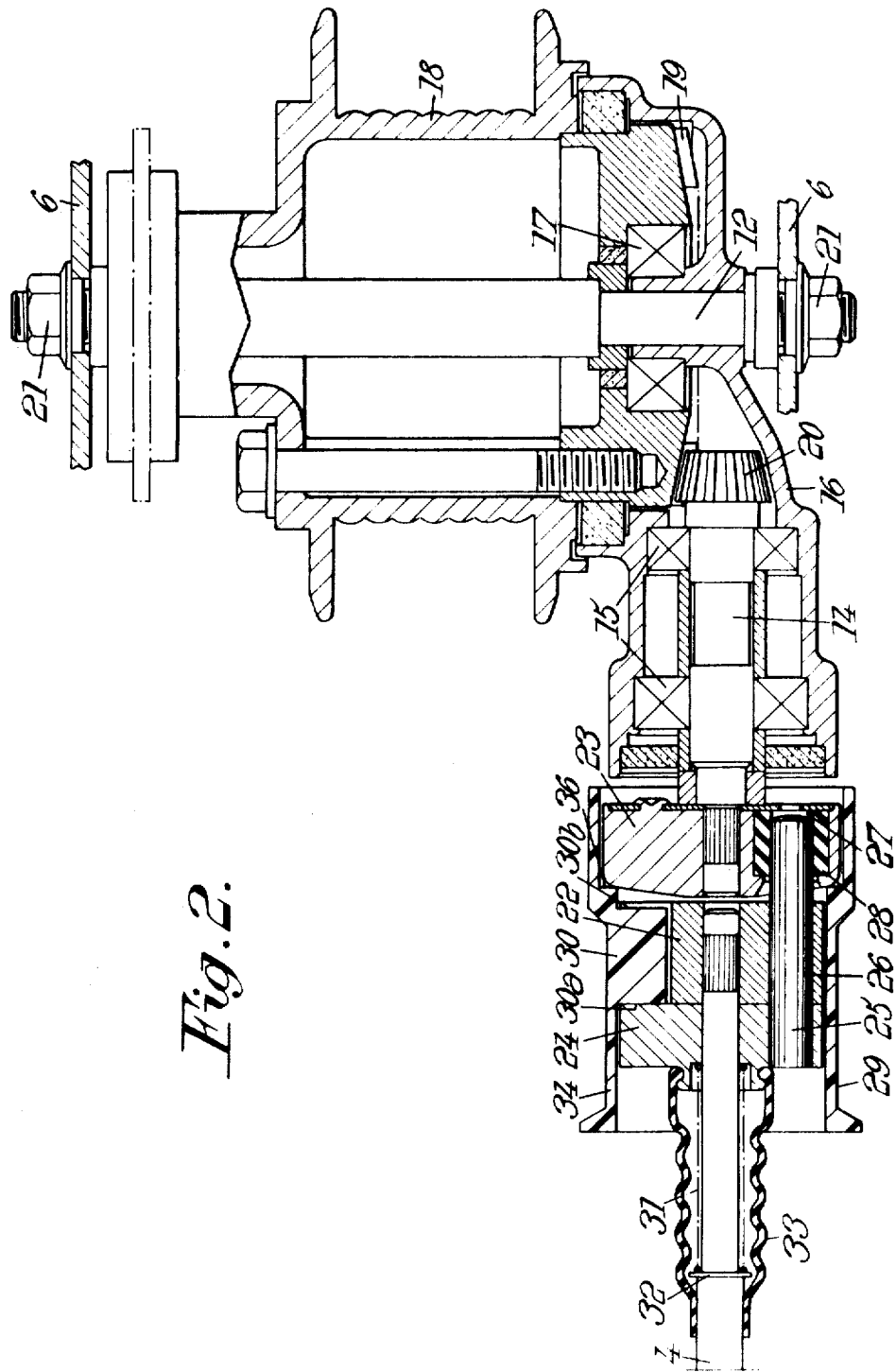

3,592,284

MOTORBICYCLE

The invention relates to motor bicycles of the kind whose rear-driving wheel is connected to the engine by a substantially horizontal transmission shaft.

It is an object of the invention to enable bicycles of this kind to be made simply and economically and to enable the rear wheel to be demounted readily.

According to the invention, therefore, the engine is mounted in the frame by means constituting a transverse horizontal pivot passing substantially through the engine center of gravity, the engine being prevented from rotating around the pivot only by the transmission shaft, which extends freely between the engine output shaft and an input shaft providing a connection to the rear wheel and which is kept in alignment with the engine output shaft and with the journal.

The invention can in any case be readily understood from the remainder of the description, given hereinafter, and from the accompanying diagrammatic drawings, such remainder and drawings relating to a preferred embodiment of the invention.

In the drawings:

FIG. 2 is a view to an enlarged scale and in horizontal section on the line II-II of FIG. 1 of the rearward part of the drive unit;

Figure 1:
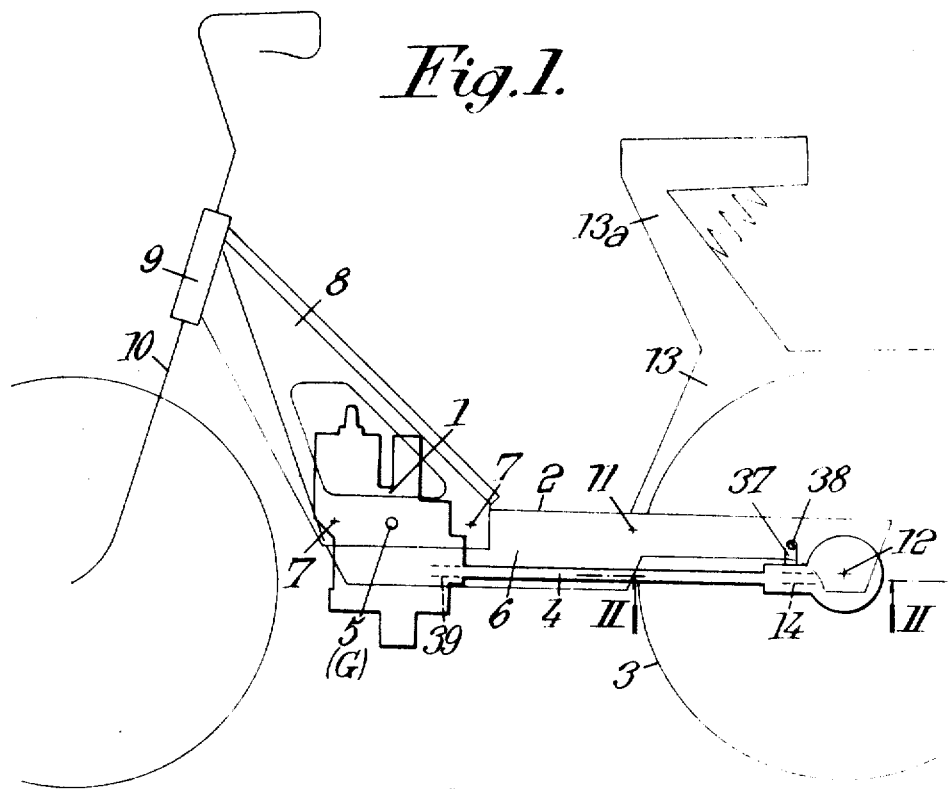
FIG. 1 is a motor bicycle according to the invention, the drive unit being shown in heavy line and the other items in thin line.

Referring to the drawings, there is shown a bicycle having an engine 1 disposed at the front part of a frame 2 and having a rear-driving wheel 3 connected to engine 1 by a substantially horizontal transmission shaft 4 (FIG. 1).

The engine 1 is mounted in the frame by means adapted to form a horizontal transverse pivot 5 passing substantially through the engine center of gravity G: all that prevents the engine 1 from rotating around the pivot 5 is the transmission shaft 4 which extends freely between engine output shaft 39 and an input shaft 14 connecting the same to the rear wheel 3 and which is kept aligned with the integers 39, 14 by any mechanical coupling suitable for the purpose and which will therefore not be described here in detail.

Advantageously, the frame 2 is embodied by a horizontal bearer 6 having secured to its front part by two horizontal parallel rods 7 a horizontally inclined leg 8 which is formed by a metal box member and which bears a steering socket 9 receiving front fork 10; the horizontal bearer 6 has secured to its rear part, also by means of two parallel rods 11, 12—the rod 12 being formed by the rear wheel shaft—a metal shell-like member 13 serving as a rigid support for a saddle upright 13a and as a mudguard for the rear wheel. The pivot 5 can take the form of two half-pivots extending one each through the two sides of the leg 8 and disposed between the two rods 7. Most of the engine 1 can therefore be received inside the base of the leg 8, and the engine 1 can so extend through the front part of the bearer 6, that as can be seen in FIG. 1, only the bottom part of the engine is visible.

To connect shaft 4 to the rear wheel, shaft 4 is coupled, in a manner to be described in detail hereinafter, with the shaft 14 (FIGS. 2 and 3) which is mounted by means of bearings 15 in a casing 16 through which rod 12 extends. Mounted on the rod 12 with the interposition of bearings, as 17, is rear wheel hub 18; the same bears a conical toothed ring 19 which meshes with a conical gearwheel 20 rigidly secured to the rear end of the shaft 14. The ends of rod 12 extend through both sides of the bearer 6 and are screw threaded to receive securing nuts 21. Casing 16 is releasably secured to bearer 6, e.g. by means of a lug 37 rigidly secured to casing 16 and of a screw 38.

So that the rear wheel 3 can be dismantled without disturbing the transmission shaft 4, a coupling is interposed between shaft 4 and shaft 14 and has a control member which is permanently connected to shaft 4 and which is so devised as, when brought to the position corresponding to disengagement of the transmission, to secure shaft 4 to frame 2, whereas such control member, when brought to the position corresponding to the transmission being in operation, leaves the system formed b the shaft 4 and shaft 14 freely suspended between the engine 1 and the connection to the rear wheel. Advantageously, the coupling takes the form of two flanges 22, 23 rigidly secured one each to those ends of shaft 4 and shaft 14 which are disposed opposite one another at a reduced spacing, the coupling also comprising a ring 24 which bears at least one finger 25 (and preferably three fingers, as can be seen in FIG. 4) parallel to the shaft 4 and which is so mounted for sliding thereon that finger 25 engages either simultaneously in two apertures 26, 27 pierced one each in the two flanges 22, 23 and adapted to be aligned with one another (engaged position shown in FIG. 2) or just in the aperture 26 extending through the flange 22 associated with shaft 4 (disengaged position shown in FIG. 3).

To allow for slight misalignment between shaft 4 and shaft 14, the aperture 27 is, conveniently, pierced not directly in flange 23 but in a rubber block 28 secured therein.

Figure 3:
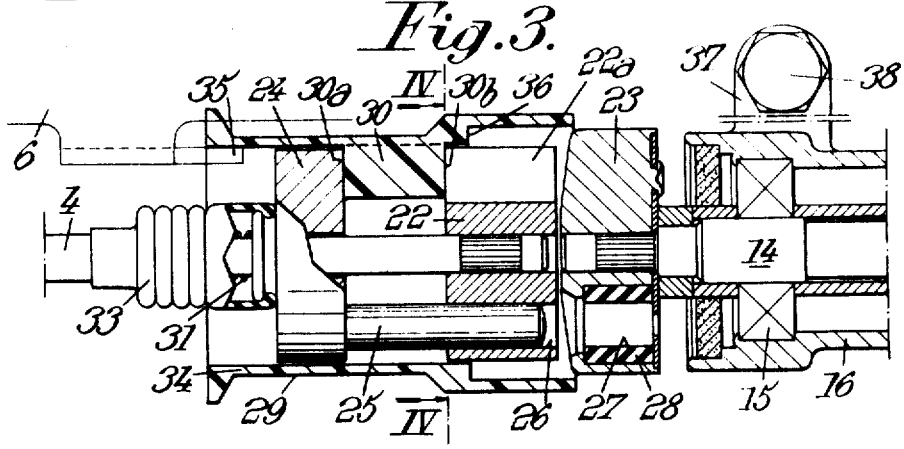
FIG. 3 is a view in vertical section showing some of the items of FIG. 2 in a different position.
Figure 4:
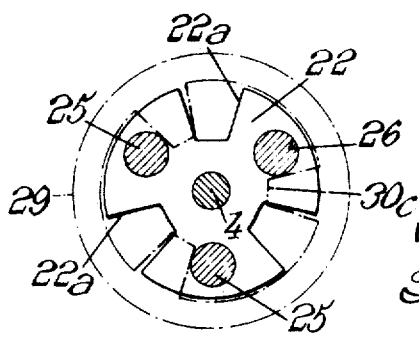
FIG. 4 is a vertical section on the line IV-IV of FIG. 3.

Advantageously, so that ring 24 can be slid between the disengaged or separation position shown in FIG. 3 and the engaged or connection position shown in FIG. 2, an actuating or control sleeve 29 is disposed around flange 22 and ring 24 and has an enlarged part 30 whose front surface 30a can cooperate by abutment with the rear surface of ring 24 and which has internally a cylindrical form of a shape other than circular and adapted to the outer shape of flange 22, so that, when the system is in the engaged position shown in FIG. 2, the widened part 30 extends around flange 22 and, therethrough, connects sleeve 29 to shaft 4 for rotation, whereas when the system is in the disengaged position shown in FIG. 3, after the flange 22 and the sleeve 29 have been rotated slightly relatively to one another, the rear surface 30b of the widened part 30 can abut flange 22. As FIG. 4 shows, flange 22 can be inscribed in a cylindrical surface of revolution and be formed with radial slots 22a between the parts formed with the apertures 26, and the widened part can take the form of teeth 30c whose solid profile corresponds substantially to the shape of the recessed part of the slots 22a.

Conveniently, a spring 31 which tends to bias the ring 24 rearwardly is interposed between the same and the shaft 4 to keep the ring 24 and sleeve 29 in their two end positions. Advantageously, spring 31 is a helical spring which is wound around shaft 4 and which bears at its rearward end on ring 24 and at its forward end on a disc 32 connected to shaft 4 by a shoulder thereof or similar means. Protective bellows 33 made of rubber or some similar material can be placed around spring 31 and disc 32.

Since when the system is in the disengaged position in FIG. 3 the engine would have a certain degree of freedom to pivot around its pivot 5 (FIG. 1), sleeve 29 is advantageously adapted to engage automatically with frame 2, more particularly with the bearer 6, when brought to the disengaged position. To this end, sleeve 29 is extended forwardly beyond ring 24 by a skirt 34, and bearer 6 comprises a catch projection 35 which can be seen in FIG. 3 and which extends rearwardly and which is disposed in the vertical sense slightly below the top generatrix of the skirt's inner surface and in longitudinal sense slightly in front of the front edge of skirt 34 when the latter is in the engaged position shown in FIG. 2.

If it is desired to eliminate axial freedom of the sleeve 29 in the engaged position, sleeve 29 can have a transverse bearing surface 36 which is adapted, when the elements are in the engaged position, to be urged against the front surface of flange 23 by spring 31.

The invention therefore provides a motor bicycle whose drive unit can be coupled and uncoupled as follows:

The coupling 22—25, 30 aligns shaft 4 with journal 14, and casing 16 and bearings 15 maintain shaft 14 substantially in alignment with the axis of rod 12. In the engaged position shown in FIGS. 1 and 2, the engine 1 is prevented from rotating around pivot 5 because it is fixedly associated with the axis of shaft 4. The coupling 22—25, 30, which transmits the torque from flange 22 via the or each finger 25, can, due to the rubber blocks 28, take up minor angular separations between the axes of shaft 4 and shaft 14. The coupling members are vibration-free since spring 31 urges ring 24 against surface 30a of widened part 30 of sleeve 29, so that transverse surface 36 thereof bears on flange 23.

To take off the rear wheel 3, the user pushes the sleeve 29 forwards (from the position in FIG. 2 to the position in FIG. 3) against the force of the spring 31 and rotates the sleeve 29 slightly (into the relative angular position shown in FIG. 4) to bring the teeth 30c out of alignment with the slots 22a in flange 22. This step has three results. The fingers 25 disengage from the apertures 27 in flange 23 and cease to connect shaft 4 to shaft 14; sleeve 29 catches by means of its skirt 34 on projection 35 and supports engine 1 and shaft 4 (but does not have to withstand large forces since pivot 5 is disposed near the center of gravity of the engine); and sleeve 29, whose widened part 30 is clamped between flange 22 and ring 24 by the force of the spring 31, locks the ring 24 in the disengaged position. Screw 38 can then be removed, whereafter nut 21 can be slackened and bearer 6 lifted off the rear wheel so that the same can be taken off with its transmission accessories (casing 16 with lug 37, shaft 14 and flange 23), it being impossible for the accessories to impair any operations (getting the tyre off or the like) which it is required to carry out on the rear wheel. To reassemble the rear wheel, the same operations as are used for taking it off are used but in the converse order.

The invention therefore provides a motor bicycle which satisfactorily meets the requirements set out in the beginning hereof: the rear wheel can be demounted and reassembled readily, and the motor bicycle is simple and cheap to manufacture since to mount the engine all that are required are means embodying the single pivot 5.

I claim:

1. A motor bicycle having an engine and a rear driving wheel mounted in a frame, and a substantially horizontal transmission shaft interconnecting the engine and the rear driving wheel, wherein the engine is mounted in the frame by means constituting a transverse horizontal pivot passing substantially through the engine center of gravity, the engine being prevented from rotating around the pivot only by said transmission shaft, said transmission shaft extending freely between an output shaft of the engine and an input shaft providing a connection to the rear wheel and being held in alignment with the engine output shaft and with said input shaft.

2. A motor bicycle as claimed in claim 1, wherein said frame comprises a horizontal bearer having secured to it at the front a leg inclined to the horizontal and formed by a metal box member and bearing a steering socket receiving the front fork, and wherein the engine is housed mostly inside the base of the leg and extends through the front part of the horizontal bearer so that only the lower part of the engine is visible.

3. A motor bicycle as claimed in claim 1, wherein to connect the transmission shaft to the rear wheel the transmission shaft is connected by a coupling to the input shaft, said input shaft being mounted in a casing through which a rod extends, said rod forming the rear wheel shaft and having the rear wheel hub on it, the rear wheel hub bearing a conical toothed ring meshing with a conical gear wheel rigidly secured to the rear end of the input shaft.

4. A motor bicycle as claimed in claim 3, wherein the coupling has a control member permanently connected to the transmission shaft and so devised as, when brought to a position corresponding to disengagement of the transmission, to secure the transmission shaft to the frame.

5. A motor bicycle as claimed in claim 4, wherein the coupling comprises two flanges which are rigidly secured one to the end of the transmission shaft and the other to the end of the input shaft which are disposed facing and slightly separated from one another, the coupling also comprising a ring bearing at least one finger parallel to the transmission shaft, the ring being adapted to slide on the transmission shaft between a transmission-engagement position in which the finger engages simultaneously in two apertures disposed one each in the two flanges and adapted to be aligned with one another, and a transmission-disengagement position in which the finger engages only in the aperture extending through the flange of the transmission shaft.

6. A motor bicycle as claimed in claim 5, wherein the aperture in the flange rigidly secured to the input shaft is pierced in a rubber block secured in the flange.

7. A motor bicycle is claimed in claim 5, wherein the control member takes the form of a sleeve having an enlargement whose front surface can abut the rear surface of said slideable ring and which is internally of a cylindrical shape of other than circular profile and adapted to the outer profile of the flange of the transmission shaft.

8. A motor bicycle as claimed in claim 5, wherein a spring is interposed between the transmission shaft and the slideable ring and tends to bias said ring rearwardly.

9. A motor bicycle as claimed in claim 7, wherein the control sleeve is extended forwardly beyond the slideable ring by a skirt and wherein the frame bears a connecting projection adapted to cooperate with the skirt.

UNITED STATES PATENT OFFICE
CERTIFICATE OF CORRECTION

Patent No. 3,592,284                              Dated   July 13, 1971

Inventor(s)   Bernard Rene Mennesson

It is certified that error appears in the above-identified patent and that said Letters Patent are hereby corrected as shown below:

On the cover sheet [73] Assignee "Societe D'Apparils De Controle Et D'Equipment Des Moteurs S.A.C.E.M. Neuilly-Sur-Seine, France" should read -- Societe D'Appareils De Controle Et D'Equipment Des Moteurs S.A.C.E.M. Neuilly-Sur-Seine, France --.

Signed and sealed this 14th day of March 1972.

(SEAL)
Attest:

EDWARD M.FLETCHER,JR.                    ROBERT GOTTSCHALK
Attesting Officer                        Commissioner of Patents

UNITED STATES PATENT OFFICE
CERTIFICATE OF CORRECTION

Patent No. 3,592,284                    Dated July 13, 1971

Inventor(s) Bernard Rene Mennesson

It is certified that error appears in the above-identified patent and that said Letters Patent are hereby corrected as shown below:

Assignee name

Change "Societe D'Apparils De Controle Et
        D'Equipment Des Moteurs S.A.C.E.M.
        Neuilly-Sur-Seine, France"

to    -- Societe D'Appareil De Controle Et
        D'Equipement Des Moteurs S.A.C.E.M.
        Neuilly-Sur-Seine, France --

This certificate supersedes Certificate of Correction issued March 14, 1972.

Signed and sealed this 4th day of July 1972.

(SEAL)
Attest:

EDWARD M. FLETCHER, JR.        ROBERT GOTTSCHALK
Attesting Officer            Commissioner of Patents